United States Patent [19]

Fredlund et al.

[11] Patent Number: 5,666,215
[45] Date of Patent: Sep. 9, 1997

[54] SYSTEM AND METHOD FOR REMOTELY SELECTING PHOTOGRAPHIC IMAGES

[75] Inventors: John Randall Fredlund, Rochester; David Lynn Patton, Webster; Roger R. A. Morton, Penfield; Steven Bruce Paciocco, Spencerport, all of N.Y.

[73] Assignee: Eastman Kodak Company, Rochester, N.Y.

[21] Appl. No.: 510,941

[22] Filed: Aug. 3, 1995

Related U.S. Application Data

[63] Continuation-in-part of Ser. No. 201,735, Feb. 25, 1994, abandoned.

[51] Int. Cl.⁶ .................. H04N 1/04; G03F 3/10
[52] U.S. Cl. ........................... 358/487; 358/527
[58] Field of Search .................. 358/487, 527, 358/506, 508, 402, 434, 500, 407, 440, 403, 442, 501; 355/38, 40, 41; 364/401 R

[56] References Cited

U.S. PATENT DOCUMENTS

| | | | |
|---|---|---|---|
| 4,528,643 | 7/1985 | Freeny, Jr. | 364/900 |
| 5,270,839 | 12/1993 | Parulski et al. | 358/444 |
| 5,420,699 | 5/1995 | Yamanouchi et al. | 358/487 |
| 5,448,372 | 9/1995 | Axman et al. | 358/403 |
| 5,477,353 | 12/1995 | Yamasaki | 358/487 |

OTHER PUBLICATIONS

Select-A-Print, "American Drug Store" Feb. 18-21, 1993.

Primary Examiner—Kim Vu
Assistant Examiner—Fan Lee
Attorney, Agent, or Firm—Thomas H. Close

[57] ABSTRACT

A photographic image can be viewed at a customers location on her personal computer and images selected for initial printing, reprinting and ordering related image services. Photographic negatives are provided to a scanner to obtain image data. The image data is manipulated to provide a positive image of the photographic negatives and sent to the customers personal computer. The desired prints are then selected and order information is provided, based on the positive image as displayed on the display of the personal computer. The order information is recorded to allow the desired prints and services to be created and the resulting order is sent to a designated addressee.

16 Claims, 10 Drawing Sheets

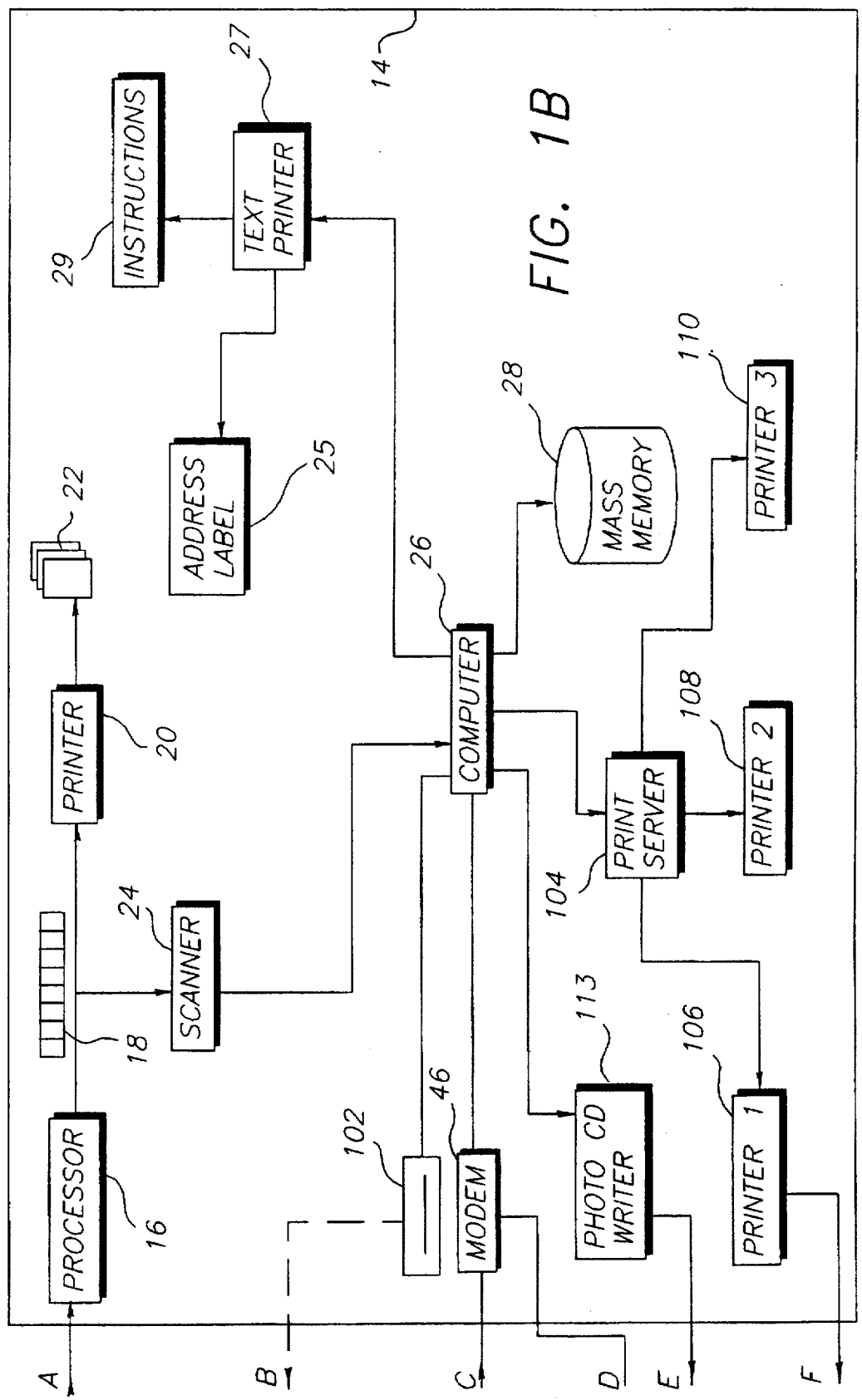

FIG. 5

SYSTEM AND METHOD FOR REMOTELY SELECTING PHOTOGRAPHIC IMAGES

This is a continuation-in-part of application Ser. No. 08/201,735, filed Feb. 25, 1994, entitled "System and Method for Selecting Photographic Images" by J. R. Fredlund, D. L. Patton, R. A. Morton and S. B. Paciocco, now abandoned.

TECHNICAL FIELD

The present invention is directed to the field of photo processing and, more particularly, to the selection and ordering of photographic images for printing and other image related services.

BACKGROUND ART

A number of systems have been proposed for electronic processing of prints. These include Kodak's Creat-a-Print, where the customer goes to a photo store or mini lab location, inserts his negatives and zooms and crops or enlarges the image prior to printing. Other systems, like Kodak's Image Magic, provide for a combination of a stored background image with that of a "live" image of the customer, for prints which have been cropped and composed at a theme park. In addition, Photo CD™ optical disc services provides a method for putting selected images at full 35 mm film resolution on a Photo CD™ optical disc.

Often, however, a consumer faces a problem in that he has received a number of prints from a photo dealer or in the mail from a photo finisher and he wishes to send additional copies of these prints to other friends or relatives, or receive additional copies for himself, or to receive other services related to the selected images, such as picture frames for the prints, a Photo CD™ optical disc bearing the selected image(s), correspondence related to the selected image(s), or cropped enlargements.

In traditional photo processing environments, there has always been the difficulty of determining which photographic negative contains the image of choice. The customer often has difficulty determining which photographic negative contains the image of choice. Also, the customer often has difficulty interpreting the negative as it would appear printed. The customer must identify the images of interest on the negative by identifying each negative to the prints he wants. He must then return the negative to the mini lab, photo store, or photo finisher, either in person or by mail and then must specify the size and number of each print, and any other image related services. He must then wait for the new prints to be made and then obtain these prints from the drug store, mini lab, or photo finisher.

There are a number of problems with this approach. For instance, the sensitive film negative must be handled multiple times by the customer, adding a potential for scratching, fingerprinting, and otherwise damaging the film. Also, the sleeve must be written on to convey the ordering information. This works well if the customer does not insert the negatives into the sleeve before writing on it. Otherwise, there is a potential for damaging the film by writing on the sleeve while the film is within. There is also a potential for improper recording of data. Furthermore, the small negative image is not easily identifiable by the customer, particularly when there are several similar images. Another problem is that the images on the film do not always line up well with the preflashed numbers on the edge of the film. For example, the customer is often confused as to whether an image is "number 9", number "9A", or number "10". This confusion can result in selection of the wrong images for reprint. Options such as zoom and crop are very difficult for the customer to specify and as a result are ordered infrequently. When a customer does order reprints, the negatives may be stored haphazardly and apart from the original prints, making the negatives difficult to retrieve at a later date for ordering reprints. Finally, this somewhat arduous process of obtaining additional prints provides little impetus for ordering reprints and other image related services. The inconvenience of ordering is a barrier to ordering reprints and other image related services.

It is seen then that it would be desirable to have an improved system and method for facilitating ordering and re-ordering of prints and other image related services from negatives. Additionally, services such as picture frames for the prints, a Photo CD™ optical disc bearing the selected image(s), correspondence related to the selected image(s), or cropped enlargements would be ordered more often if the ordering process was facilitated and the ordered prints and services could be delivered directly to a designated recipient.

SUMMARY OF THE INVENTION

The present invention is a system for facilitating ordering of prints from negatives, and enables a customer to select size, quantity, destination, text, frames and other options associated with photographic prints. The present invention streamlines the previously inconvenient means of selecting and ordering photographic reprints.

In accordance with the present invention, the customer sends photographic negative film to a photo finisher, which then develops the film, scans the film, and stores the scanned image(s). The photofinisher transmits a display file of the scanned images to the customer either by sending a floppy disc containing the display file, or by transmitting the display file over a communication link. The customer is able to display the images(s) on his or her personal computer monitor or interactive TV along with an index number associated with each image. The customer then selects images and services and orders the desired number and size of prints and other image related services for the selected images, and designates a recipient for the order. The designated recipient may be different from the customer placing the order. The photofinisher completes the order and sends the prints to the designated recipient and sends the bill to the customer or charges the customer's credit card account.

Accordingly, it is an object of the present invention to provide a system and method for facilitating ordering and re-ordering of prints from negatives. It is a further object of the present invention to enable a customer to select other services related to the selected images, such as picture frames for the prints, a Photo CD™ optical disc bearing the selected image(s), correspondence related to the selected image(s), or cropped enlargements. It is an advantage of the present invention that the previously inconvenient means of selecting and ordering photographic prints and reprints is streamlined and can be done from the convenience of the customer's own home.

Other objects and advantages of the invention will be apparent from the following description, the accompanying drawings and the appended claims.

BRIEF DESCRIPTION OF THE DRAWINGS

FIG. 5 is a view of a second screen display for entering order information in a user interface employed with one embodiment of the present invention.

DETAILED DESCRIPTION OF THE PREFERRED EMBODIMENTS

Figure 1A:
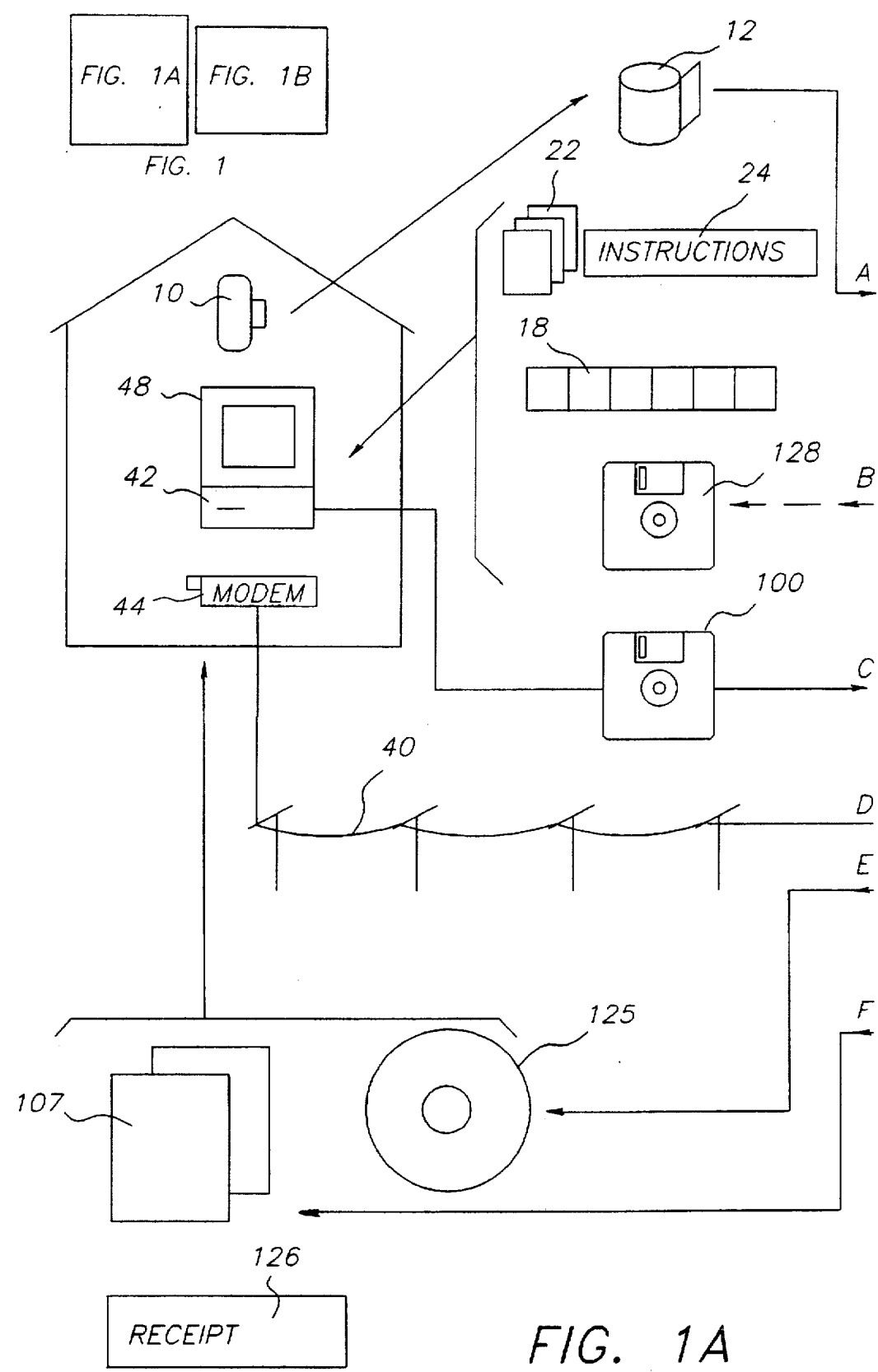
FIG. 1 is a block diagram of a system for remotely selecting photographic prints and related services according to the present invention.

Referring now to FIG. 1, there is illustrated a system for remotely selecting and ordering photographic prints and services according to the present invention. A customer exposes film in a camera 10 and sends or takes the cassette 12 of exposed film to a photo processing lab 14 where the film is developed in a film processor 16 to produce developed film 18. As is well known, a retail outlet such as a photo store, drugstore, or supermarket may act as an intermediary in sending the film to the photo processing lab. The processed film 18 may be printed in a photographic printer 20 to produce a set of prints 22. The processed film 18 is also scanned in a scanner 24 to produce a digital image file of the images on the film. A computer 26 controls the scanner 24, processes the digital image file, and sends the digital image file along with a customer order number and a unique customer identification number to a mass storage device 28 such as a magnetic tape drive or an optical disc.

A text printer 27 connected to the computer 26 prints out a bill and instructions 29 for the customer on how to order reprints and other image related services. The prints 22, film 28 and instructions 29 are returned to the customer for example by mail, or to a photo retailer where they are picked up by the customer.

The image on the film 18 is scanned at, for example, twenty-four bits per pixel, or eight bits for each of the three color channels of the scanning device. The digital image is in general a 3-plane (cyan, magenta, yellow) color image if scanned from color negative or 3-plane (red, green, blue) if scanned from slide film. The digital film scanner 24 should have large enough dynamic range and bit-depth in each scanned color plane to resolve both image shadow and highlight detail without introducing digital scanning artifacts (e.g. contouring). A film scanner with 12-bit linear response with respect to scanned image intensity is preferable. To enable enlargements of 8"×10" or larger from 35 mm film, scanners with pixel resolutions of 2K (vertical)× 3K (horizontal) pixels per color plane have been found to yield good results. This also corresponds to the scanner resolution and bit-depth selections found to give outstanding results in Kodak's PhotoCD product. The digital images from scanner 24 are passed to computer 26 as 3-plane, 2K×3K pixel, digitized color images, along with other information such as whether the original media was slide or negative film.

Figure 2:
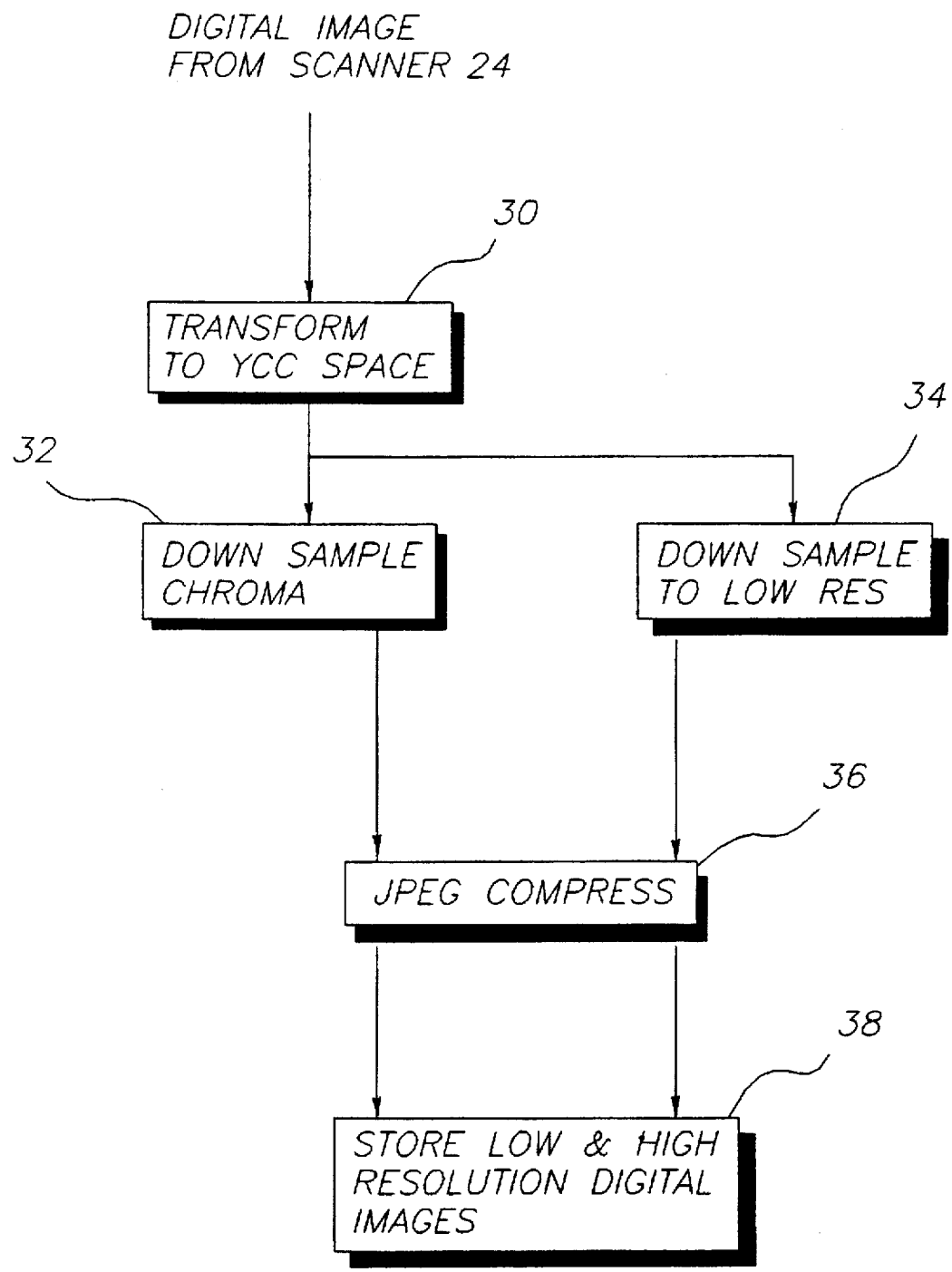
FIG. 2 is a flow chart illustrating the digital image compression employed in one embodiment of the method of the present invention.

As shown in FIG. 2, the digital image from the scanner is processed by computer 26 to form a high resolution version and a low resolution (display) version and to compress the digital image. The digital images are processed (30) to convert the negative film scans from cyan, magenta, and yellow color space to Kodak's YCC color space (a luminance Y, and color difference signal CC color space). Slide film scans are converted from red, green, blue color space to Kodak's YCC color space. The bit-depth of each pixel in a color plane is reduced from 12-bits to 8-bits using a non-linear luminance mapping which more evenly distributes quantization errors based on human perception rather than image intensity.

The high resolution version of the YCC image is reduced in size by first down sampling (32) in each chrominance channel by a factor of 2:1 in each of the x-direction and y-directions in the image. This can generally be done with very little loss of data due to the reduced information content in these channels. To generate the low resolution version of the image, both the chrominance and luminance channels are down sampled (34), for example to 320 by 200 pixels.

The images are further reduced in storage requirement by performing JPEG image compression (36) on both the low and high resolution images. The compression ratio achieved will depend on the image content and desired freedom from artifacts due to the compression process. The compression technique and compression quantization matrix are selected to enable compression ratios on the order of 5:1 to 15:1 to be achieved.

Alternately, a lower spatial resolution (e.g. 1K×1.5K pixels) scanner 24 may be used to scan the film image in combination with a compression module which uses smaller compression ratios (e.g. 1.5:1 to 3:1) to achieve a similar compressed storage image file size. The lower scanning data rate advantage of this method is offset by more limited ability to enlarge the resulting stored image without introducing visible image artifacts. The resulting compressed high and low resolution image files are stored (38) in storage device 28.

Returning to FIG. 1, in one embodiment of the invention, the computer 26 communicates over a communication channel 40 with a customer's personal computer or interactive video system 42 via a communications device such as a set-top box 44 connected to a television set, or a communications device such as a modem 46 connected to the customer's personal computer 42. The communication channel 40 may be standard telephone lines, an interactive cable TV network, or other communication channel.

Responding to the instructions 29 and using appropriate identification, the customer through the personal computer 42 or set-top box/television combination is able to access the low resolution version of their digital image file contained in storage device 28. In the case of the computer, these images are then transferred over the communication channel to the personal computer 42 where the images are displayed on a display device such as a CRT 48 associated with the personal computer 42. The operator of the personal computer 42 is able to execute a suitable program which has been created by a programmer of ordinary skill in the art. The program and user interface may be written in the Windows environment. The program for generating the customer interface is preferably transmitted along with the low resolution version of the images from the photo processing lab. The program may also contain code for presenting a display advertising special sales of photographic prints and services such as price discounts, bonus prints, or larger size prints. The program may also contain creative graphics that may be combined with the images, such as artistic borders or backgrounds that can be selected and ordered with the prints. The program may also provide customers with capabilities for adjusting image properties such as exposure (darkness or lightness), tone scale, and color balance and color saturation; and improving or enhancing the image such as red-eye reduction, sharpening, image retouching, zooming, cropping, image rotation, and addition of text to the image area.

The program may also include means for providing good color quality rendition on the customer's display device using known image color management techniques such as the Intercolor 2.0 standard; Picture Windows by Digital Light and Color; ColorSense available from the Eastman Kodak Company, Rochester, N.Y.; or Kodak Precision Color available from Kodak Electronic Prepress Systems.

Figure 3:
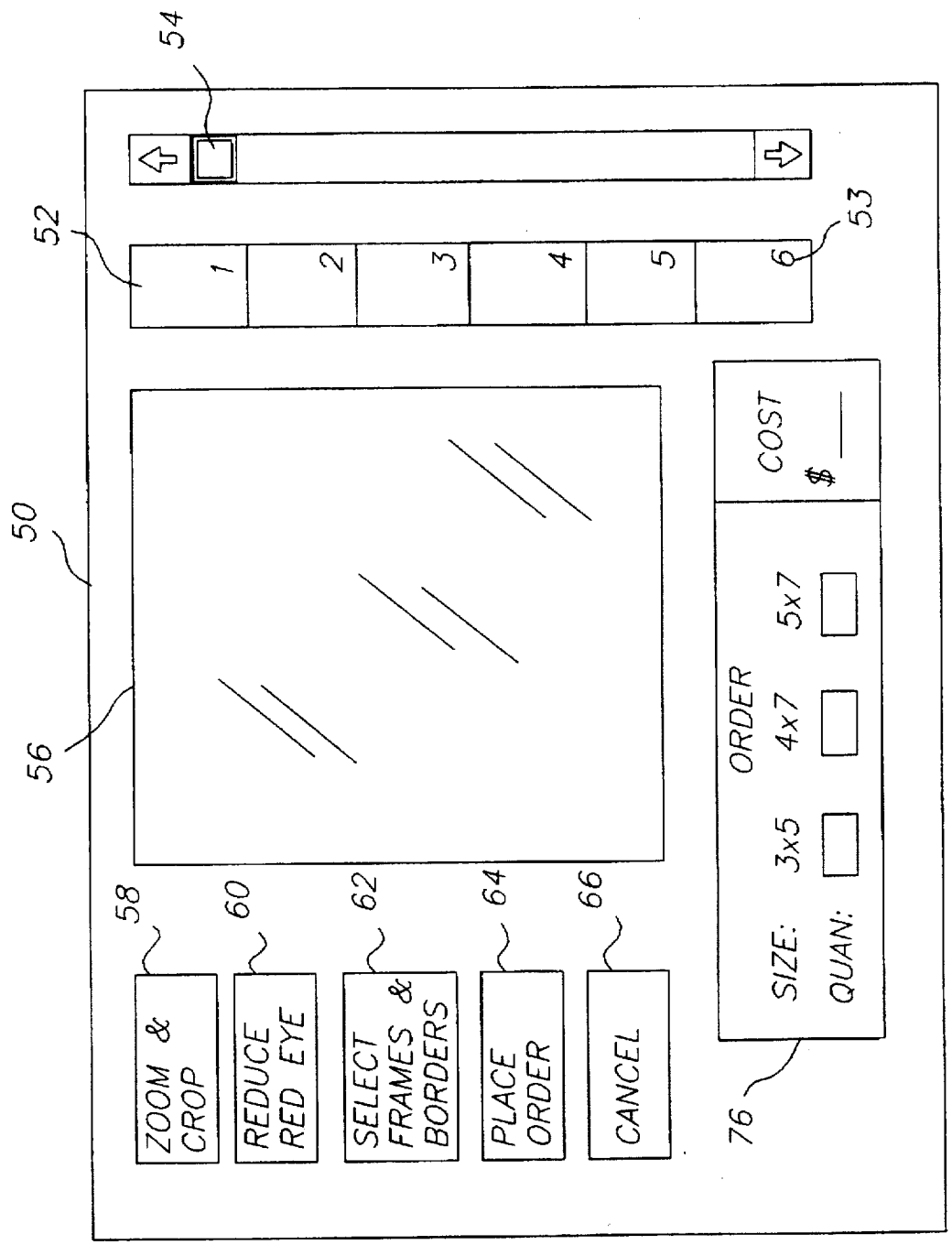
FIG. 3 is a view of a screen display for image management in a user interface employed with one embodiment of the present invention.

As Shown in FIG. 3, the program displays a graphical user interface 50 on the display device 48 that enables the customer to select the photographic services desired. The graphical user interface 50 displays the low resolution imagettes (28) from the digital image file in a column 52. Each image in the column has an index number 53 in its lower right hand corner, which numbers correspond to images on the film 18. The images will appear on the display in the same sequence in which they appear on the film strip 18. That is, images 1, 1A, 2, 2A, 3, 3A, and 4, 4A appear in the same sequence on the film strip 18 as on the display. Optical character recognition (OCR), bar code reading, or other suitable means may be used at the photofinisher to assign a number (i.e., 1, 2, 3, 4, as shown) to each image on the film strip. The customer then sees both the image and a corresponding image number 1, 2, 3, 4 on the screen 26, with the image numbers 1, 2, 3, 4 corresponding to film negatives 1 or 1A, 2 or 2A, 3 or 3A, and 4 or 4A, respectively.

If there are more images in the file than can be shown in the column 52, the other images can be displayed by activating a scroll bar 54 to scroll the images in the column. To select one of the images from the digital image file, the customer selects the desired print size and quantity in area 76. Display area 56 assumes the correct aspect ratio for the desired final print size. The customer then identifies one of the images using a standard drag and drop computer interface or set-top box selection mode, for example by clicking on one of the images with a mouse or trackball and dragging it into the large display area 56, or by entering the desired frame number on a remote control device if the program is implemented via a set-top box. The customer can thereby use the computer data entry means to select one at a time the images he or she desires to have printed and desired services relating to each selected image. In this manner, a simple, non-intimidating display can be used to enter all necessary order information. Other image related services may include Photo CD's, image bearing items such as coffee mugs and T-shirts, and poster sized prints.

When a selected image has been displayed in the display area 56, operations on the displayed image can be performed. For example, when the zoom and crop command button 58 is activated, a program allows the customer to manipulate the displayed image to change magnification in the display area and to translate the image in the X- and or Y- directions in the display area. The coordinates of the operations performed by the customer are recorded and returned to the photo processing lab for use in processing the customer's order. Other operations, such as image rotation, may also be provided along with the zoom and crop operations. Rotation of the image may be useful in composing a Photo CD™, or to level a horizon in an image. If the customer wishes to reduce the visibility of red eye effects in the image, she selects the red eye reduction operation by activating command button 60. In response, a program with customer instructions for reducing red eye is activated. When the customer is satisfied with the results, the coordinates and parameters for reducing the red eye are recorded for return with the customer order. The photofinisher uses the coordinates and parameters in processing the customer order.

The customer can also select a variety of frames and borders for the image by activating the select frames command button 62. In response, various styles and options for frames and borders are displayed. When the customer selects one of the styles or options, the appearance of the image in the frame or border is demonstrated in display area 56. The frame and style selections are recorded for return with the customer order. The photofinisher uses the frame style and selection information in processing the customer order.

Figure 4:
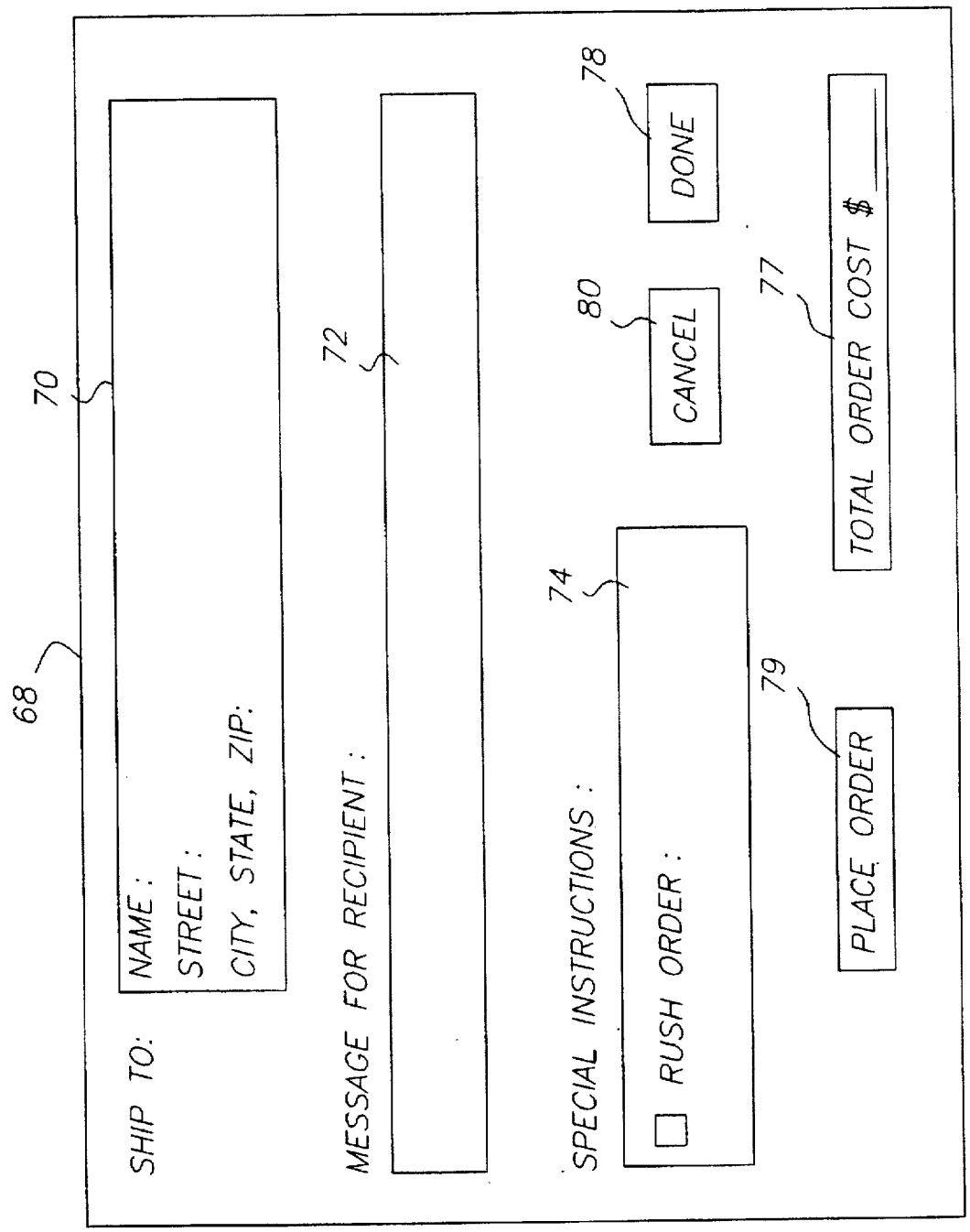
FIG. 4 is a view of a first screen display for entering order information in a user interface employed with one embodiment of the present invention.

When the customer has completed the selection and modifications with respect to an image, she activates the place order command button 64. Alternatively, a cancel command button 66 can be activated to exit the program or to restart the selection procedure. Referring to FIG. 4, when the place order command button 64 is activated, an order information interface 68 is displayed. The order information interface includes an area 70 for entering the shipping address for the order, an area 72 for entering a message for the recipient of the order, an area 7& for any special instructions to the photo processing lab. The area 77 includes a display of the total order cost for the options selected.

When the order for a particular image is completed, the customer actuates the "done" command button 78 which either returns the customer to the first interface screen 50 to place another order with respect to another image. Actuating the "Place Order" button 79 advances to the payment interface screen. The settings and image selected on screen 50 remain the same unless specifically changed by the user. This facilitates sending the same image to different addresses in screen 68 without re-editing the image. Alternatively, a cancel command button 80 can be activated to return to the first interface screen 50 to place another order, or to exit the program.

Figure 5:
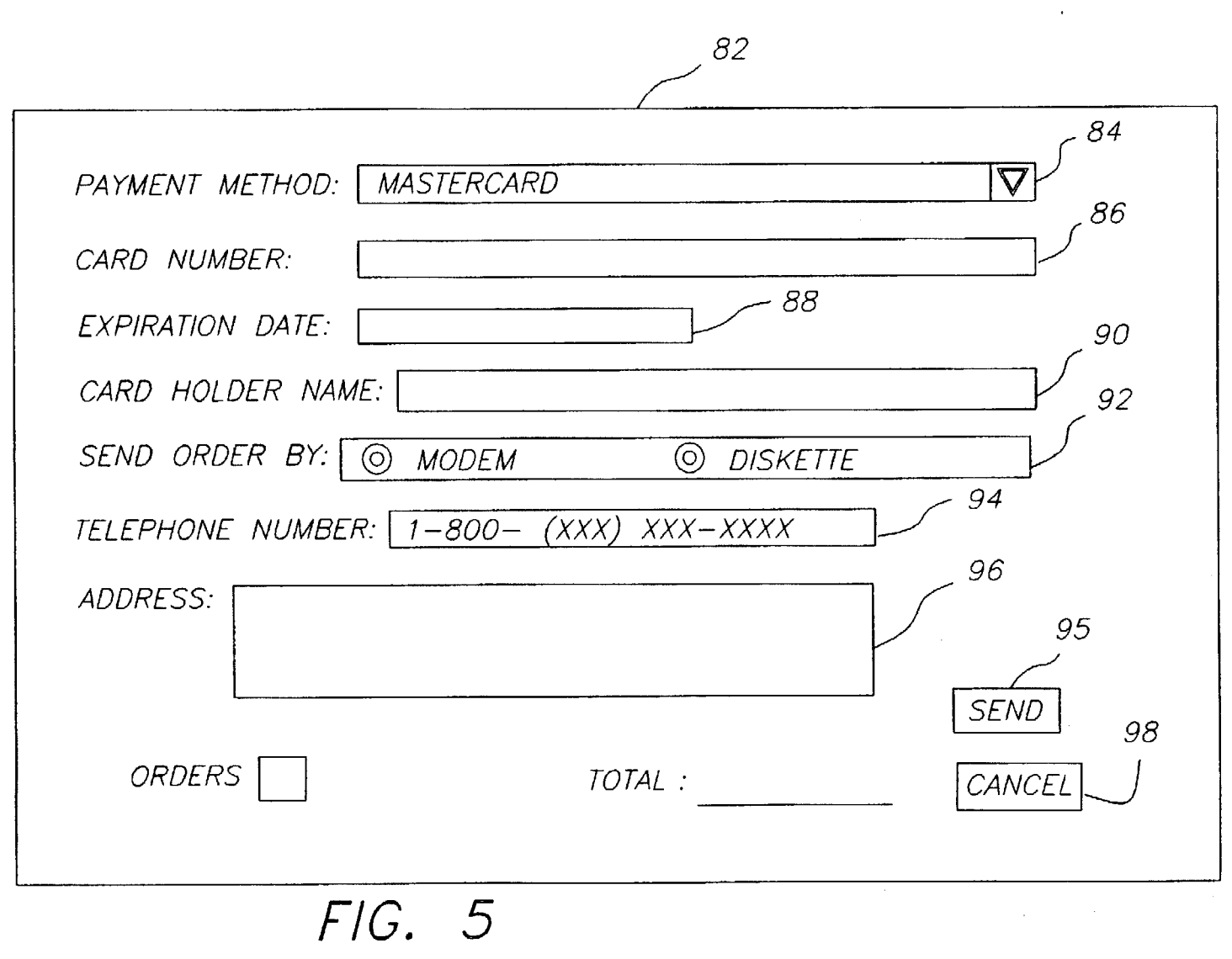

When the order information for all the desired orders is completer a payment interface screen 82 as shown in FIG. 5 is displayed. The payment interface screen 82 includes a scroll area 84 for indicating payment method, such as Master Card, or Visa. Spaces 86, 88 and 90 are provided for entering the payment card number, the card holders name and the card expiration date, respectively. A set of option buttons 92 are provided for indicating whether the order will be sent by modem or diskette. If the modem option is selected, a 1-800 phone number 94 for sending the order may be displayed, and after communication with the photo processing lab is established, the order can be sent by activating a "send" control button 95. If the diskette option is selected, an address 96 for sending the diskette to the photo processing lab may be displayed. A cancel button 98 allow the user to cancel the order and return to the main screen shown in FIG. 3. As noted previously, the program for generating the customer interface screens 50, 68, and 82) is preferably transmitted along with the low resolution version of the images from the photo processing lab. Instructions regarding the image adjustments are transmitted to the photofinisher and incorporated in the photographic prints.

Referring back to FIG. 1, the order information selected by the customer, including zooming and cropping, choice of image sizes, correspondence and addresses associated with specific images, text on the back of images, text to personalize images such as greeting cards and birth announcements, insertion of images in preprepared backgrounds, Photo CD™ optical disc bearing the selected images, picture frames for the prints, image bearing articles such as mugs, T-shirts, calendars, hats, refrigerator magnets, etc., is communicated through communication channel 40 to the photo processing lab 14. The customer can also send an sound file representing sampled audio to the processing lab to add sound producing capability to the image related product, such as a magnetic coating on the image containing recorded sound, or a sound chip associated with the image related product such as a picture frame including a sound chip. Alternatively, as mentioned above, the order information can be returned to the photo processing lab 14 by sending the information on a computer readable diskette 100 which can be read by a disc drive 102 connected to the computer 26.

The order can be filled manually by the photofinisher, or automatically as shown in FIG. 1, where the computer 26 also controls an image-capable print server 104 which is connected to a variety of printers. The printers may include for example a digital silver halide printer 106 for exposing conventional silver halide photographic paper to produce enlargements 107, a color thermal printer 108, or a large format color ink jet printer 110 for making poster sized prints. Also connected to computer 26 is a CD writer 113 for producing Photo CD's 125. Computer 26 can manipulate scanned high resolution image files from mass storage 28 such that the desired prints or Photo CD™ optical disc, or image bearing articles are created.

Figure 6:
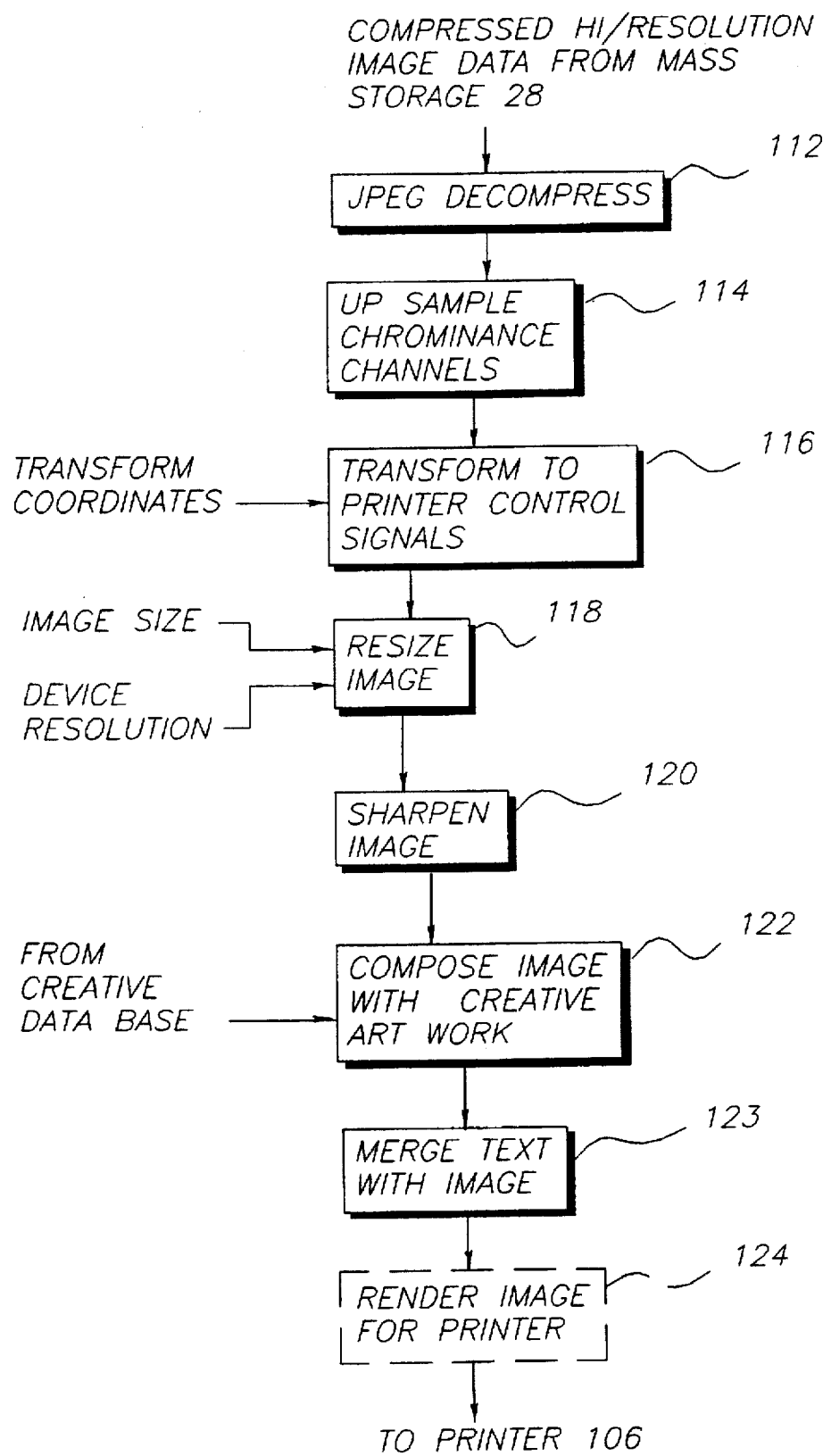
FIG. 6 is a flow chart illustrating the digital image decompression employed in one embodiment of the method of the present invention.

The operations performed by the computer 26 in the photo processing lab 14 will now be described with reference to FIG. 6. To utilize the stored compressed image, JPEG decompression is applied (112) to reverse the effects of the JPEG compression step (36). The chrominance channels are then up sampled (114) to reverse the down sampling (32) previously performed on these channels. Color correction is performed (116) as necessary to translate the encoded Kodak YCC image color space image into the control signal space necessary to drive the intended printing device. Other color, intensity, or tone scale transformations may also be incorporated in this step to achieve the effects desired by the customer.

The image is then resized (118) based on the desired final image size and the image printer's writing resolution (i.e. pixels per inch). The previous two steps are sometimes reversed to eliminate unnecessary pixel computations (e.g. color correction may be performed after resizing when the resulting image is to be significantly reduced in size to avoid color correcting pixels which would never be printed as a result of a subsequent resizing step).

Image sharpening is generally performed (120) as one of the last steps in the processing chain to compensate for the image printer's natural modulation transfer function (MTF). Alternately, this sharpening step is sometimes performed prior to resizing to save processing time if significant enlargement is requested and the resulting loss of image quality will not be objectionable.

Next, the image is composed with creative art work (122). The creative artwork such as borders and backgrounds is stored in a database associated with computer 26. If a custom text option has been selected by the user, the text is merged with the image (123). If the customer selected printing device is not able to reproduce "continuous-tone" color (i.e. 8-bits per pixel per color plane) to make this final print, a halftoning step (124) is employed following the composing step (122) to render the image to the reduced number of bits capable of being printed per pixel per color by the final image printing device (e.g. an inkjet print might be reduced to 1-bit per pixel per color to accommodate this device's bitonal printing capability).

The computer 26 can also output on the text printer 27 any text associated with the image, including cover letters or correspondence to be sent along with specific prints and instructions regarding the selection of picture frames. Text printer 27 can be used to print out labels for inclusion in albums or on the backs of prints, based on information provided by the operator of the personal computer 42. Text printer 27 can also be used to print out instructions, address labels 25 and billing information 29 to be mailed to the customer along with the prints and other services.

In the embodiment just described, the low resolution images were transmitted to the customer's personal computer via a communication link such as a modem and telephone line, or to a set-top box via a television cable. Alternatively, the low resolution images, along with any program for display of the images and selection of services may be recorded on a floppy disc 128 by disc drive 102 and sent to the customer along with his prints 22, developed film 18, and instructions 29. The customer would then display the images on his computer 42, generate the order and either return the order on a floppy disc 100, or by communication link 40.

Figure 7A:
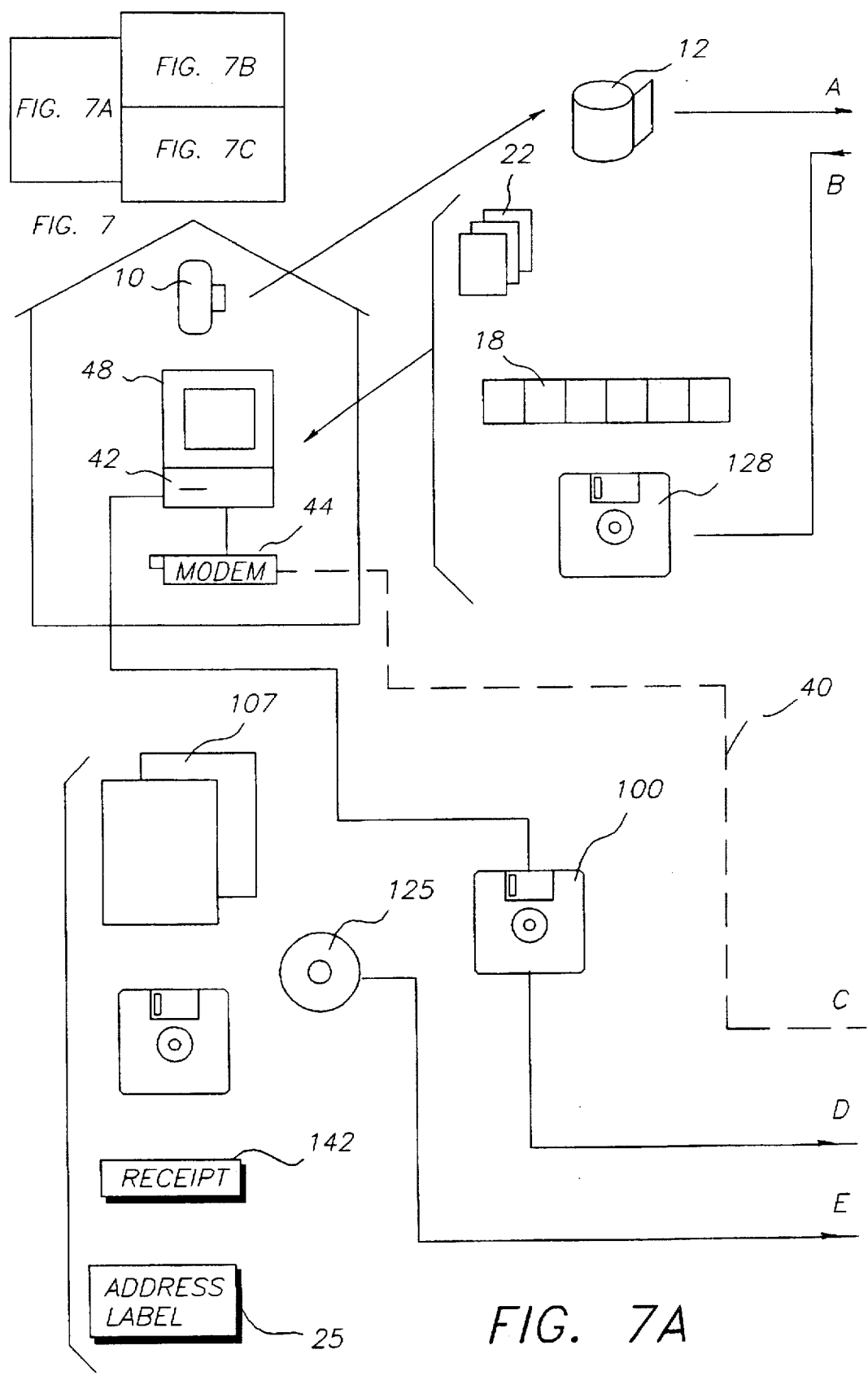
FIG. 7 is a schematic block diagram showing an alternative system for remotely selecting photographic prints according to the method of the present invention.
Figure 7B:
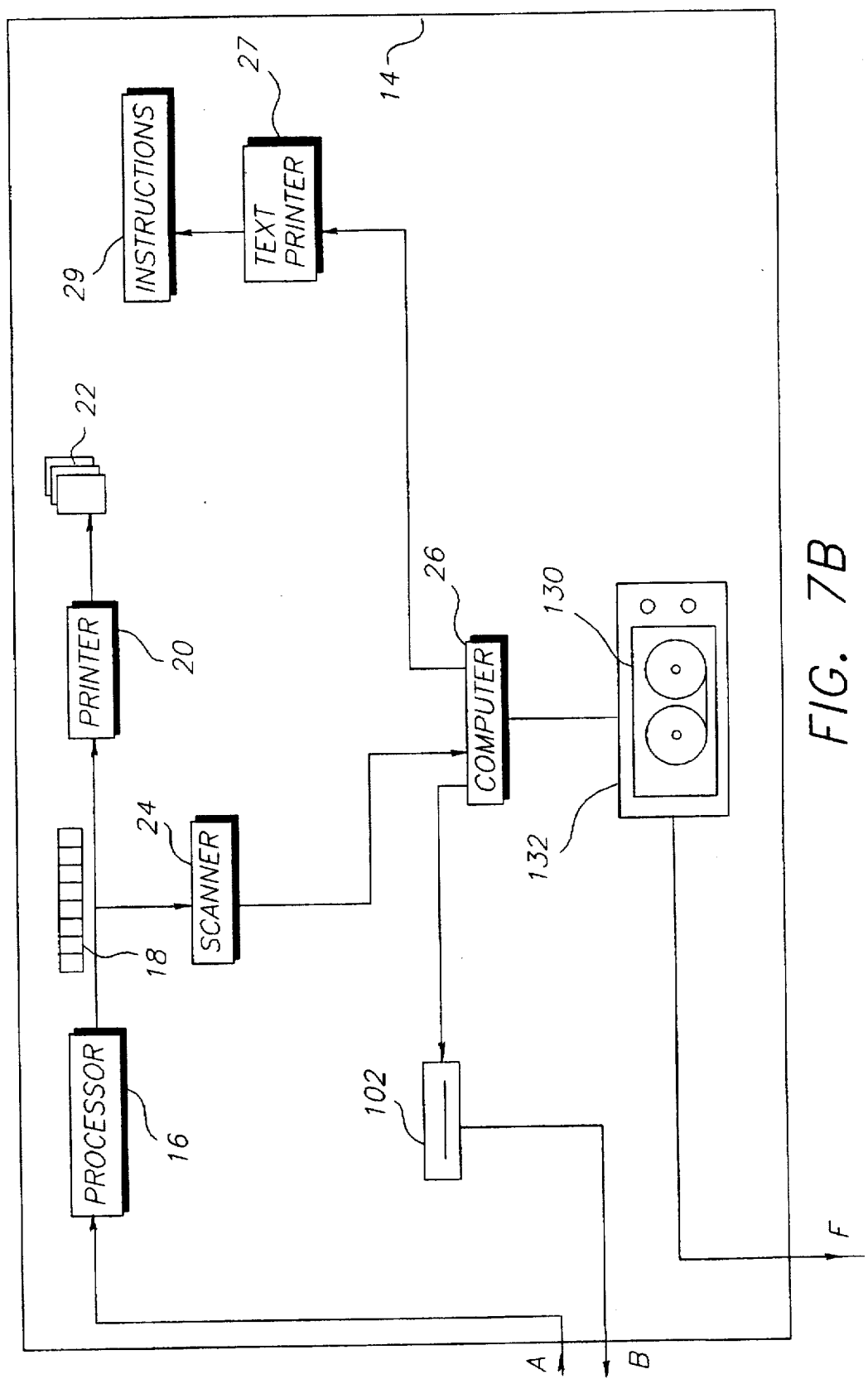
Figure 7C:
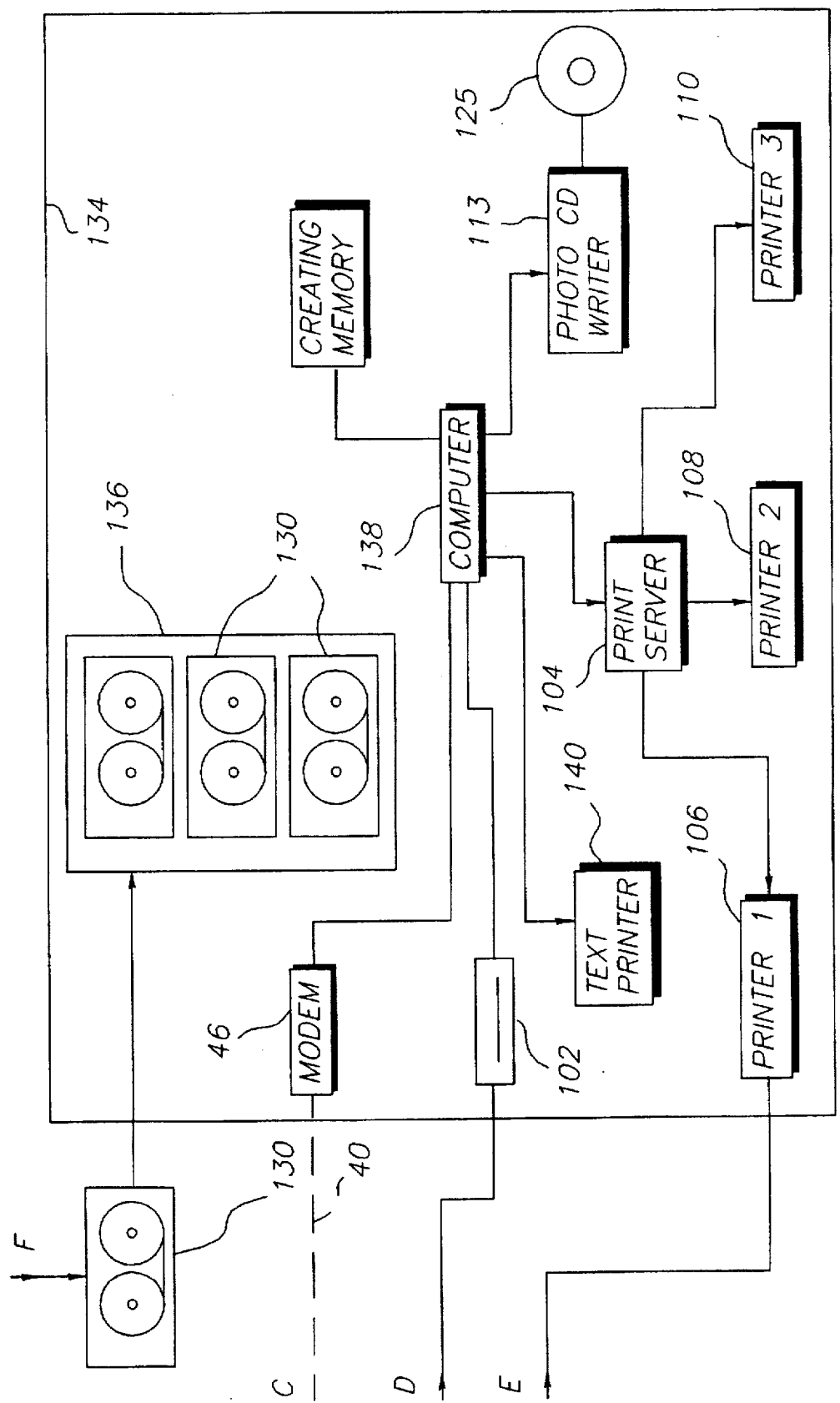

Because the equipment for storing and digitally printing the images according to the present invention represents a significant capital investment, it may be more financially attractive to separate these functions from the photoprocessing laboratory and concentrate them in a digital image center that serves a number of photoprocessing laboratories. Such an arrangement is shown in FIG. 7. The customer sends the film cartridge 12 to the photo processing laboratory 14, where it is developed, printed and scanned as in the previous example. The low resolution version of the digital image file from the scanner 24 is recorded on a floppy disc 128 in disc drive 102 and sent along with the prints 22, developed film 18 and instructions 29 printed by text printer 27 to the customer. Alternatively, the low resolution images may be sent to the customer's computer via communication link and modems as described previously.

The high resolution digital image file from scanner 26 is recorded on a tape 130 in a tape drive 132 and the tape is sent to a digital image center 134. At the digital image center 134, the tape is placed in a tape library 136 where it can be accessed by a second computer 138. The customer reviews the low resolution digital image file and prepares an order as described previously. After the order is prepared, the customer communicates the order to the digital image center 134, either by sending a floppy disc 100 containing the order information to the digital image center, or by communicating the order information over a telecommunication link 40 via modems 44 and 46 as described above. The order is filled by accessing the appropriate tape 130 in the tape library 136 to retrieve the applicable high resolution digital image file and driving the appropriate printer 106–110 via the print server 104 to produce prints 107, or the Photo CD writer 113 to produce a Photo CD 125. A text printer 140 is employed to print a receipt 142 and address and mailing labels 25 that are returned to the customer with the order.

Industrial Applicability and Advantages

The present invention is useful in the field of photo processing in that it reduces the inconvenience of ordering prints, reprints, and image related services from photographic negatives. The present invention has the advantage of streamlining the previously inconvenient means of selecting and ordering photographic prints, reprints and image related services. The present invention has the further advantage of decreasing the multiple handlings of sensitive film negatives by the customer. The present invention offers the potential for eliminating unwanted prints by allowing the customer to peruse the images before ordering an initial printing of the negative. The present invention also has the advantage of eliminating improper recording of data. Finally, the present invention has the advantage of making negative images more easily identifiable by the customer, particularly when there are several similar images.

Having described the invention in detail and by reference to the preferred embodiment thereof, it will be apparent that other modifications and variations are possible without departing from the scope of the invention defined in the appended claims.

Parts List 10 camera
12 film cassette
14 photo processing lab
16 film processor
18 processed film
20 photographic printer
22 photographic prints
24 film scanner
25 mailer address label
26 computer
27 text printer
28 mass storage device
29 instructions
30 convert digital image to YCC space step
32 downsample chroma step
34 downsample to low resolution step
36 JPEG compress step
28 store compressed images step
40 communication channel
42 personal computer
44 modem
46 modem
48 display device
50 user interface screen
52 column of images
53 index number
54 scroll bar
56 image display area
58 zoom and crop command button
60 reduce red eye button
62 select frames and borders button
64 place order button
66 cancel button
68 order information interface screen
70 shipping address area
72 message area
74 special instructions area
76 print size and quantity area
77 total cost display area
78 done button
79 place order button
80 cancel button
82 payment interface screen
84 payment method scroll area
86 payment card number area
88 card holder name area
90 card expiration date area
92 order option buttons
94 phone number display
95 send button
96 address display
98 cancel button
100 diskette
102 disc drive
104 print server
106 digital printer
107 enlargements
108 thermal printer
110 ink jet printer
112 JPEG decompression step
114 up sampling step
116 color transform step
118 resize image step
120 image sharpen step
122 compose image with creative art work step
123 merge text with image step
124 halftoning step
128 floppy disc
130 tape cassette
132 tape drive
134 digital image center
136 tape library
138 second computer
140 text printer
142 receipt

What is claimed is:

1. A method for remotely selecting and ordering photographic prints from a customer's location that is remote from a photofinisher, comprising the steps of:

a) sending a photographic film bearing a plurality of latent negative images to a photofinisher;

b) developing the photographic film to produce negative images and scanning the negative images to create a digital image file at the photofinisher;

c) manipulating the digital image file in a digital computer to provide a display file for generating a positive display of the images in the image file along with an index number associated with each image;

d) transmitting the display file from the photofinisher to the customer's remote location;

e) selecting the desired size and quantity of prints;

f) displaying the display file on a display device in the customer's remote location;

g) selecting desired images for making photographic prints;

h) transmitting the frame numbers associated with the selected images from the customer's remote location to the photofinisher; and i) making photographic prints of the selected images at the photofinisher and delivering the photographic prints to the customer's remote location.

2. The method for remotely selecting and ordering photographic prints claimed in claim 1, wherein the step of transmitting the display file from the photofinisher to the customer's remote location is performed by recording the display file on a floppy disc and sending the floppy disc to the customer's remote location.

3. The method for remotely selecting and ordering photographic prints claimed in claim 1, wherein the step of transmitting the display file from the photofinisher to the customer's remote location is performed by electronically transmitting the display file over a communication link from the photofinisher to the customer's remote location.

4. The method for remotely selecting and ordering photographic prints claimed in claim 1, wherein the step of transmitting the frame numbers associated with the selected images from the customer's remote location to the photo finisher is performed by recording the frame numbers on floppy disc and sending the floppy disc to the photofinisher.

5. The method for remotely selecting and ordering photographic prints claimed in claim 1, wherein the step of transmitting the frame numbers associated with the selected images from the customer's remote location to the photofinisher is performed by electronically transmitting the frame numbers over a communication link from the customer's remote location to the photofinisher.

6. The method for remotely selecting and ordering photographic prints claimed in claim 1, further comprising the steps of:
   a) transmitting customer pricing information from the photofinisher to the customer's remote location along with the display file; and
   b) upon receipt of order information, billing the customer according to the transmitted pricing information.

7. The method for remotely selecting and ordering photographic prints claimed in claim 1, further comprising the step of: employing an image color management technique to control the color quality of the images displayed on the display device at the customer's remote location.

8. The method for remotely selecting and ordering photographic prints claimed in claim 1, further comprising the steps of:
   a) providing the customer with the capability to manipulate their images by implementing one or more techniques selected from the list of: adjusting exposure, adjusting tone scale, adjusting color balance, adjusting color saturation; reducing red-eye, sharpening, zooming, cropping, image rotation, adding text to the image area, inserting images into pre-made templates, and retouching the image;
   b) transmitting instructions for implementing the selected techniques from the customer's remote location to the photofinisher; and
   c) incorporating the selected image manipulation into the photographic prints.

9. A method for remotely selecting and ordering photographic prints and image related services from a customer's location that is remote from a photofinisher, comprising the steps of:
   a) sending a photographic film bearing a plurality of negative images to a photofinisher;
   b) developing the photographic film to produce negative images and scanning the negative images to create a digital image fie at the photofinisher;
   c) manipulating the digital image file in a digital computer to provide a file for generating a positive display of the images in the image file along with an index number associated with each image;
   d) transmitting, upon request from a customer, the manipulated digital image file and a computer program relating to the manipulated digital image file from the photofinisher to a customer's remote location;
   e) displaying the manipulated image file along with a list of image related services on a display at the customer's remote location, the list of image related services being selected from the list of a desired number and size of prints, cropping coordinates for cropped enlargements, picture frames for the prints, a Photo CD™ optical disc bearing selected digital images, correspondence related to selected images, recorded audio associated with the image, and a destination for sending prints and services; and
   f) sending an order specifying the index number of selected images and an identification of related services from the customer's remote location to the photofinisher; and
   g) fulfilling the order at the photofinisher and sending the prints and services to the designated destination.

10. The method for remotely selecting and ordering photographic prints claimed in claim 9, further comprising the steps of:
   a) transmitting a computer program for displaying customer pricing information from the photofinisher to the customer's remote location along with the display file; and
   b) upon receipt of customer order information, billing the customer according to the transmitted pricing information.

11. The method claimed in claim 10, wherein the computer program includes a program for enabling the customer to select the images and services.

12. The method claimed in claim 10, wherein the computer program includes a program for displaying creative art work into which a customer can insert selected images.

13. A method for remotely selecting and ordering photographic prints from a customer's location that is remote from a photofinisher, comprising the steps of:
   a) sending a photographic film bearing a plurality of latent negative images to a photofinisher;
   b) developing the photographic film to produce negative images and scanning the negative images to create a digital image fie at the photofinisher;
   c) manipulating the digital image file in a digital computer to provide a display file for generating a positive display of the images in the image file along with an index number associated with each image and storing the display file on a floppy disc;
   d) manipulating the digital image file to provide a high resolution file for printing the digital images in the digital image file on a digital image printer and storing the high resolution file on a magnetic tape;
   e) sending the display file from the photofinisher to the customer's remote location;
   f) sending the magnetic tape containing the high resolution image file to a digital image center;
   g) displaying the display file on a display device at the customer's remote location;
   h) selecting desired images for making photographic prints;

i) transmitting the frame numbers associated with the selected images from the customer's remote location to the digital image center;

j) making digital photographic prints of the selected images at the print center on a digital printer using the high resolution image file; and k) sending the photographic prints to a customer designated location.

14. The method for remotely selecting and ordering photographic prints claimed in claim 13, wherein the frame numbers associated with the photographic images are transmitted by modem from a computer at the customer's remote location to the digital image center.

15. The method for remotely selecting and ordering photographic prints claimed in claim 13, wherein the frame numbers associated with the photographic images are transmitted by recording them on the floppy disc and sending the floppy disc to the digital image center.

16. The method for remotely selecting and ordering photographic prints claimed in claim 13, further comprising the step of adding a program to display price information along with the display file on the floppy disc sent to the customer's remote location.

* * * * *